US011501155B2

(12) United States Patent
Sivaraman et al.

(10) Patent No.: US 11,501,155 B2
(45) Date of Patent: Nov. 15, 2022

(54) LEARNING MACHINE BEHAVIOR RELATED TO INSTALL BASE INFORMATION AND DETERMINING EVENT SEQUENCES BASED THEREON

(71) Applicant: EMC IP Holding Company LLC, Hopkinton, MA (US)

(72) Inventors: Diwahar Sivaraman, Bangalore (IN); Rashmi Sudhakar, Bangalore (IN); Kartikeya Putturaya, Bangalore (IN); Abhishek Gupta, Bangalore (IN); Venkata Chandra Sekar Rao, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1235 days.

(21) Appl. No.: 15/966,501

(22) Filed: Apr. 30, 2018

(65) Prior Publication Data

US 2019/0332932 A1 Oct. 31, 2019

(51) Int. Cl.
 *G06F 11/00* (2006.01)
 *G06N 3/08* (2006.01)
 *G06F 11/07* (2006.01)

(52) U.S. Cl.
 CPC ............. *G06N 3/08* (2013.01); *G06F 11/004* (2013.01); *G06F 11/0751* (2013.01); *G06F 2201/805* (2013.01)

(58) Field of Classification Search
 CPC ........................... G06F 11/004; G06F 11/0751
 USPC ....................................................... 714/1–57
 See application file for complete search history.

(56) References Cited

U.S. PATENT DOCUMENTS 10,970,146 B2\* 4/2021 Nayak ................. G06F 11/0727
2005/0187940 A1\* 8/2005 Lora ....................... G06F 16/25
2008/0115017 A1\* 5/2008 Jacobson ............ G06F 11/1076
  714/710

(Continued)

OTHER PUBLICATIONS

Kumar et al., "A pragmatic approach to predict hardware failures in storage systems using MPP database and big data technologies," Advance Computing Conference (IACC), 2014 IEEE International.

*Primary Examiner* — Sarai E Butler
(74) *Attorney, Agent, or Firm* — Ryan, Mason & Lewis, LLP

(57) ABSTRACT

Methods, apparatus, and processor-readable storage media for learning machine behavior related to install base information and determining event sequences based thereon are provided herein. An example computer-implemented method includes parsing data storage information based at least in part on parameters related to install base information comprising temporal parameters and event-related parameters; formatting the parsed set of data storage information into a parsed set of sequential data storage information compatible with a neural network model; training the neural network model using the parsed set of sequential data storage information and additional training parameters; predicting, by applying the trained neural network model to the parsed set of sequential data storage information, a future data unavailability event and/or a future data loss event; and outputting an alert based at least in part on the predicted future data unavailability event and/or predicted future data loss event.

20 Claims, 14 Drawing Sheets

(56) References Cited

U.S. PATENT DOCUMENTS

| | | | |
|---|---|---|---|
| 2009/0204845 A1* | 8/2009 | Herscovitz | H04W 88/02 |
| | | | 714/2 |
| 2012/0297253 A1* | 11/2012 | Barajas | G06F 11/0727 |
| | | | 714/E11.062 |
| 2013/0055023 A1* | 2/2013 | Chong | G06F 11/366 |
| | | | 714/E11.178 |
| 2013/0283092 A1* | 10/2013 | Das | G06F 11/2097 |
| | | | 714/3 |
| 2014/0095935 A1* | 4/2014 | Zimmermann | G05B 23/0251 |
| | | | 714/33 |
| 2015/0067410 A1* | 3/2015 | Kumar | G06F 11/004 |
| | | | 714/47.3 |
| 2018/0060192 A1* | 3/2018 | Eggert | G06F 11/3409 |
| 2018/0165572 A1* | 6/2018 | Yoo | G10L 15/16 |
| 2018/0174069 A1* | 6/2018 | Childress | G06N 20/00 |
| 2018/0300375 A1* | 10/2018 | Pant | G06F 16/2465 |
| 2019/0325061 A1* | 10/2019 | Poirel | G06F 16/907 |

\* cited by examiner

128.221.252.35/cpu0/log:5988:W/"006016106b3795445-3":349312:<6>2015/09/05 13:14:20.68: tach/36 tach32 (A3-FC02): probing topology hpPublicLoop.
128.221.253.35/cpu0/log:5988:W/"006016106b3795445-3":349313:<6>2015/09/05 13:14:35.76: tach/36 tach32 (A3-FC02): probing topology hpFabric.
128.221.253.35/cpu0/log:5988:W/"006016106b3795445-3":349314:<6>2015/09/05 13:14:40.81: tach/36 tach32 (A3-FC02): probing topology hpPublicLoop.
128.221.253.35/cpu0/log:5988:W/"006016106b3795445-3":349315:<6>2015/09/05 13:14:55.89: tach/36 tach32 (A3-FC02): probing topology hpFabric.

| TIME STAMP | IP ADDRESS | EVENT_ID | EVENT_SEVERITY | SEQUENCE |
|---|---|---|---|---|
| 12/7/2011 20:54 | 128.221.252.36 | ZPEM/460 | ERROR | 38 |
| 12/7/2011 20:55 | 128.221.252.36 | ZPEM/470 | ERROR | 39 |
| 12/7/2011 20:56 | 128.221.252.36 | ZPEM/480 | ERROR | 40 |
| 12/7/2011 20:57 | 128.221.252.36 | ZPEM/490 | ERROR | 41 |
| 12/7/2011 20:58 | 128.221.252.36 | ZPEM/87 | INFO | 42 |

FIG. 11

| TIME STAMP | IP ADDRESS | EVENT_ID | EVENT_SEVERITY | SEQUENCE |
|---|---|---|---|---|
| 12/7/2011 20:54 | 128.221.252.36 | 34 | 3 | 38 |
| 12/7/2011 20:55 | 128.221.252.36 | 35 | 3 | 39 |
| 12/7/2011 20:56 | 128.221.252.36 | 36 | 3 | 40 |
| 12/7/2011 20:57 | 128.221.252.36 | 37 | 3 | 41 |
| 12/7/2011 20:58 | 128.221.252.36 | 16 | 1 | 42 |

```
<SigmoidLayer class="pybrain.structure.modules.sigmoidlayer.SigmoidLayer" name="out" outmodule="True">
    <dim val="171"/>
    <name val=" 'out' "/>
</SigmoidLayer>
<BiasUnit class="pybrain.structure.modules.biasunit.BiasUnit" name="bias">
    <name val=" 'bias' "/>
</BiasUnit>
<LSTMLayer class="pybrain.structure.modules.lstm.LSTMLayer" name="hidden0">
    <dim val="10"/>
    <peepholes val="False"/>
    <name val=" 'hidden0' "/>
</LSTMLayer>
</Modules>
<Connections>
    <FullConnection class="pybrain.structure.connections.full.FullConnection" name="FullConnection-6">
        <inmod val="bias"/>
        <outmod val="out"/>
    </FullConnection>
    <Parameters>[-0.6950037615440737, -2.4482147419461335, -1.9772970315221454, -1.1482758966667623, -2.1137138205823107,
-3.0202747354242282, -1.0594936094463836, -2.1740680045357879, -2.5125883338151436, -2.0151934115340040, -1.6543996569670536, -1.7497333602520377,
-2.1113502471403876, -2.4218540103935401, -2.8220604563321245, -2.4204949819946102, -1.3270343761846315, -2.3972602435999599, -1.5392836555240236,
-1.4330735449859688, -2.0862030088091585, -1.3904281612780158, -2.0706666717674649, -1.6922414831745269, -2.0255461859574626, -1.6273866094384044,
-2.4782530159467462, -1.5111932911765452, -2.4673035562745222, -1.7306484968567315, -2.1509147368618367, -1.0055043268795176, -1.8695011451966701,
-2.1062917562553092, -2.0259803109530981, -1.8475768880707424, -3.0837268751463447, -2.0468566356140122, -1.5061550597175632, -3.2392748259982915,
-1.9981864201945816, -1.0647294383188952, -2.0566708594668643, -2.5904263024659060, -1.3924393318867405, -1.9233615846545042, -2.3208884194430239,
-1.7261943112808185, -1.2957670715501961, -1.7835456647254997, -2.0357399168809565, -2.2983981911027058, -0.4417680030574258, -1.6545935701745433,
-1.6787301727021944, -2.6432479715076260, -2.1763417677865098, -2.3731023726901221, -1.7390421252755255, -1.8348401537184724, -2.2555256969782116,
-1.3460575558751617, -2.7132198799792748, -2.2847379631436371, -2.1820229756144371, -1.6154440896704243, -2.0757688584498006, -2.0857041740780682,
```

FIG. 15

| TIME STAMP | IP ADDRESS | EVENT_ID | EVENT_SEVERITY | SEQUENCE NUMBER |
|---|---|---|---|---|
| 8/18/2016 3:20 | 128.221.252.35 | nmg/102 | CRITICAL | 4514 |
| 8/18/2016 3:21 | 128.221.253.67 | nmg/101 | CRITICAL | 4419 |
| 8/18/2016 3:22 | 128.221.253.35 | nmg/105 | CRITICAL | 4515 |
| 8/18/2016 3:23 | 128.221.252.35 | floor/30 | INFO | 4516 |
| 8/18/2016 3:24 | 128.221.253.67 | nmg/105 | CRITICAL | 4421 |
| 8/18/2016 3:25 | 128.221.252.35 | nmg/104 | CRITICAL | 4517 |
| 8/18/2016 3:26 | 128.221.253.67 | nmg/107 | CRITICAL | 4422 |
| 8/18/2016 3:27 | 128.221.252.35 | nmg/106 | CRITICAL | 4518 |

| PREDICTED EVENT_ID SEQUENCE |
| --- |
| nmg/104 |
| nmg/102 |
| nmg/101 |
| nmg/105 |
| floor/30 |
| nmg/106 |
| nmg/107 |
| nmg/106 |

PARSE A SET OF DATA STORAGE INFORMATION BASED ON PARAMETERS RELATED TO INSTALL BASE INFORMATION COMPRISING TEMPORAL PARAMETERS AND EVENT-RELATED PARAMETERS — 1900

FORMAT THE PARSED SET OF DATA STORAGE INFORMATION INTO A PARSED SET OF SEQUENTIAL DATA STORAGE INFORMATION COMPATIBLE WITH A NEURAL NETWORK MODEL — 1902

TRAIN THE NEURAL NETWORK MODEL USING THE PARSED SET OF SEQUENTIAL DATA STORAGE INFORMATION AND ADDITIONAL TRAINING PARAMETERS — 1904

PREDICT, BY APPLYING THE TRAINED NEURAL NETWORK MODEL TO THE PARSED SET OF SEQUENTIAL DATA STORAGE INFORMATION, A FUTURE DATA UNAVAILABILITY EVENT AND/OR A FUTURE DATA LOSS EVENT — 1906

OUTPUT AN ALERT BASED ON THE PREDICTED OF FUTURE DATA UNAVAILABILITY EVENT AND/OR PREDICTED FUTURE DATA LOSS EVENT — 1908

LEARNING MACHINE BEHAVIOR RELATED TO INSTALL BASE INFORMATION AND DETERMINING EVENT SEQUENCES BASED THEREON

FIELD

The field relates generally to information processing systems, and more particularly to techniques for reducing data unavailability and data loss scenarios.

BACKGROUND

Data unavailability scenarios preclude (often temporarily) a user's ability to access one or more items of data in information systems, and can be caused, for example, by a network outage. Data loss scenarios represent an error condition in information systems (which can often be permanent), wherein items of data are destroyed or significantly damaged as a result of one or more failures within the information systems (with respect to transmission, storage, processing, etc.). Accordingly, data unavailability and/or data loss (DU/DL) scenarios commonly lead to business losses and can also often jeopardize external and/or internal business applications.

Conventional DU/DL avoidance approaches generally include designing storage systems with high levels of redundancy and back-up capabilities. However, such conventional approaches include significant costs, and provide limited insights on customer install base (that is, the number of units of a particular product or service in use) machine storage behavior.

SUMMARY

Illustrative embodiments of the invention provide techniques for learning machine behavior related to install base information and determining event sequences based thereon. An exemplary computer-implemented method can include parsing a set of data storage information based at least in part on multiple parameters related to install base information, wherein the multiple parameters comprise at least one temporal parameter and one or more event-related parameters. Such a method can also include formatting the parsed set of data storage information into a parsed set of sequential data storage information compatible with at least one neural network model, and training the at least one neural network model using the parsed set of sequential data storage information and one or more additional training parameters, wherein training comprises learning one or more patterns in the parsed set of sequential data storage information and a connection between the one or more patterns and at least one of a data unavailability event and a data loss event. Further, such a method can include predicting, by applying the at least one trained neural network model to the parsed set of sequential data storage information, at least one of a future data unavailability event and a future data loss event, and outputting an alert based at least in part on the predicting of at least one of a future data unavailability event and a future data loss event.

Illustrative embodiments can provide significant advantages relative to conventional DU/DL avoidance approaches. For example, challenges associated with designing storage systems with high levels of redundancy and back-up capabilities are overcome through patterning and predicting of critical events categorized by machine segment. Such patterning and predicting facilitates improvements of machine segments and improvements of the quality of virtual computer data storage product install base signatures.

These and other illustrative embodiments described herein include, without limitation, methods, apparatus, systems, and computer program products comprising processor-readable storage media.

BRIEF DESCRIPTION OF THE DRAWINGS

FIG. 9 shows example log data in an illustrative embodiment of the invention.

FIG. 10 shows a table of parsed log data in an illustrative embodiment of the invention.

FIG. 11 shows a table of encoded event IDs in an illustrative embodiment of the invention.

FIG. 12 shows an example map file in an illustrative embodiment of the invention.

FIG. 14 shows an example extensible markup language (XML) file containing model weights and configuration details in an illustrative embodiment of the invention.

FIG. 15 shows example time series data in an illustrative embodiment of the invention.

FIG. 16 shows example vector data in an illustrative embodiment of the invention.

FIG. 17 shows event prediction vector data in an illustrative embodiment of the invention.

FIG. 18 shows a table of predicted event IDs in an illustrative embodiment of the invention.

FIG. 19 is a flow diagram of a process for learning machine behavior related to install base information and determining event sequences based thereon, in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
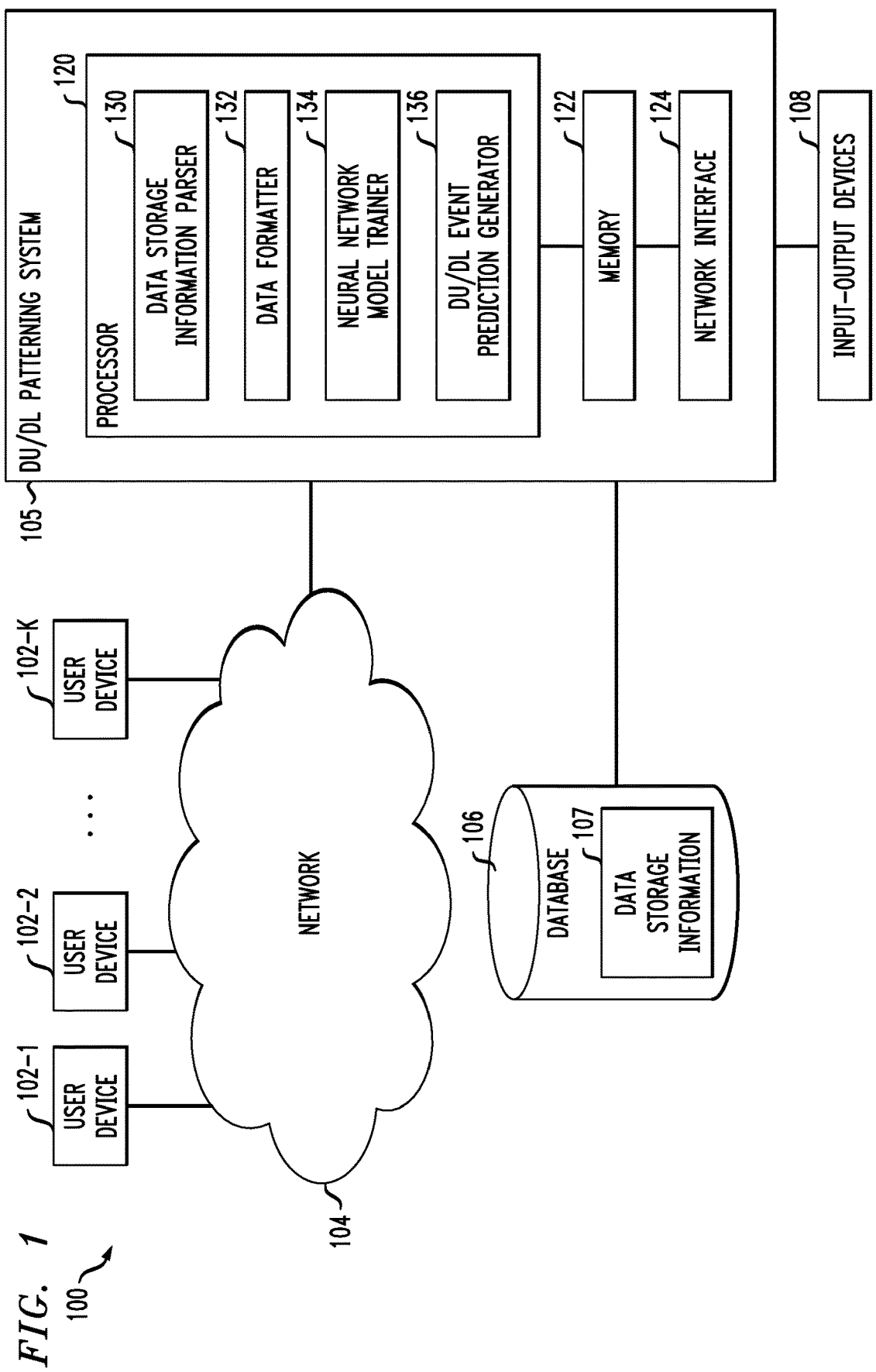
FIG. 1 shows an information processing system configured for learning machine behavior related to install base information and determining event sequences based thereon, in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is DU/DL patterning system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. Also, at least portions of the computer network 100 may also be referred to herein as collectively comprising an "enterprise network." Numerous other operating scenarios involving a variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The DU/DL patterning system 105 has an associated database 106 configured to store data related to the tasks of learning machine behavior related to install base information and determining event sequences based thereon. The database 106 more particularly stores data storage information 107 illustratively comprising, for example, multiple parameter-based information related to install base information, such as temporal parameter-based information, event-related parameter-based information, etc.

The database 106 in the present embodiment is implemented using one or more storage systems associated with the DU/DL patterning system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the DU/DL patterning system 105 are input-output devices 108, which illustratively comprise keyboards, displays or other types of input-output devices in any combination. Such input-output devices are used to support one or more user interfaces to the DU/DL patterning system 105, as well as to support communication between the DU/DL patterning system 105 and other related systems and devices not explicitly shown.

The DU/DL patterning system 105 in the FIG. 1 embodiment is assumed to be implemented using at least one processing device. Each such processing device generally comprises at least one processor and an associated memory, and implements one or more functional modules for controlling certain features of the DU/DL patterning system 105.

More particularly, the DU/DL patterning system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the DU/DL patterning system 105 to communicate over the network 104 with the user devices 102, and illustratively comprises one or more conventional transceivers.

The processor 120 further comprises a data storage information parser 130, a data formatter 132, a neural network model trainer 134 and a DU/DL event prediction generator 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the data storage information parser 130, data formatter 132, neural network model trainer 134 and DU/DL event prediction generator 136 may be implemented at least in part in the form of software that is stored in memory 122 and executed by processor 120.

It is to be understood that the particular set of elements shown in FIG. 1 for learning machine behavior related to install base information and determining event sequences based thereon involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the DU/DL patterning system 105 can be eliminated and associated elements such as data storage information parser 130, data formatter 132, neural network model trainer 134 and DU/DL event prediction generator 136 can be implemented elsewhere in the computer network 100.

An exemplary process utilizing data storage information parser 130, data formatter 132, neural network model trainer 134 and DU/DL event prediction generator 136 of the DU/DL patterning system 105 in computer network 100 will be described in more detail with reference to the flow diagram of FIG. 19.

At least one embodiment of the invention includes searching historical critical events data generated by each customer install base, and predicting one or more subsequent possible critical events. Additionally, one or more embodiments of the invention can include predicting DU/DL or other failures scenarios using deep queue networks (DQNs) by searching and training a DQN model over DU/DL events and non-DU/DL events logged in system files, in addition to messages generated during state-changes.

For example, at least one embodiment of the invention includes parsing virtual computer data storage (such as, for example, VPLEX) cluster logs generated and boosting the parsed data. Such cluster logs can include, for example, centralized file server streams firmware data, message logging information (syslogs), input/output (I/O) and product configuration logs, etc. The raw log data can be parsed, segregated against one or more types of defects, and maintained in a file with additional information such as a timestamp, an internet protocol (IP) address, an event ID, event severity, a sequence number pertaining to the order in which the logs are generated, etc. Such parsed, segregated, and stored data can then be boosted by suppressing repetitive event IDs into a single event ID in one or more log sequences.

The boosted log data can additionally be pre-processed into a given format that is compatible with one or more neural networks. For example, in at least one embodiment of the invention, customized parsed data can be pre-processed into a form of "N" grams to be compatible as input to a neural network. In connection with such pre-processing, historical data can be fetched in ascending order with respect to corresponding time-stamps for each type of defect. Accordingly, in such an embodiment, a time series of event IDs are taken into account.

Figures 2, 3:
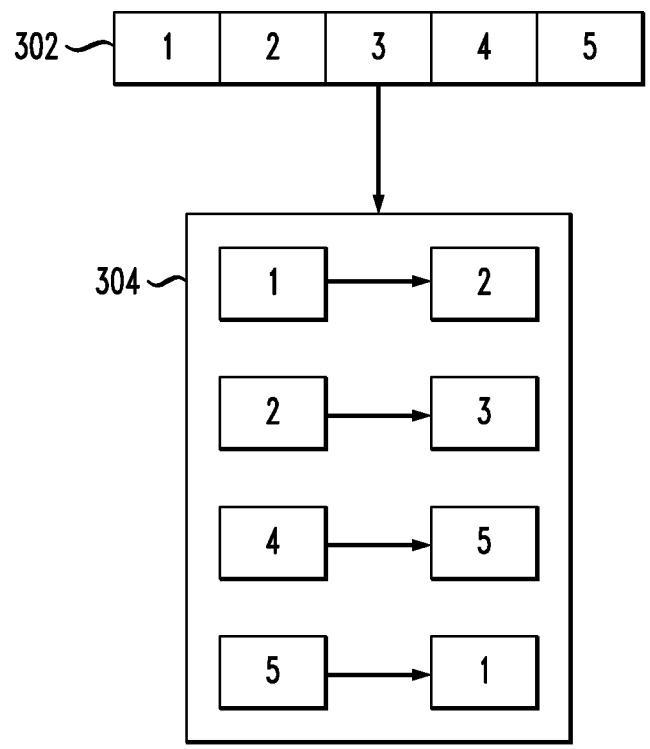
FIG. 2 shows an example map file in an illustrative embodiment of the invention.
FIG. 3 shows sequencing of encoded event identifiers (IDs) in an illustrative embodiment of the invention.

Further, encoding can be dynamically performed on the event IDs by fetching the distinct event IDs from a source file, and assigning an integer label to each of the distinct event IDs, followed by vectorizing the labels. Such an encoding process can result in the generation of a custom map file, such as depicted in FIG. 2, which contains the mapping of an event ID to a label to a vector. Accordingly, FIG. 2 shows an example map file 200 in an illustrative embodiment of the invention. Additionally, FIG. 3 shows sequencing 304 of encoded event IDs 302 in an illustrative embodiment of the invention. The map file 200 depicted in FIG. 2 is used to encode all event IDs in a source file, as depicted in FIG. 3, which can then be stored in memory. The input sequence and/or pattern of event IDs 302 can be retained and provided to a neural network model as input in the same sequence and/or pattern.

One or more embodiments of the invention additionally include neural network model configuration and training. In such an embodiment, a neural network takes one or more parameters, such as number of hidden layers, learning rate, number of epochs, number of cycles, momentum, etc., as input before training a model. Optimized parameter values can be incorporated, for example, by training a separate set of data on a different set of values by considering over-fitting and regularization characteristics. At the end of the configuration process, the parsed and pre-processed data can be passed to a multi-layer recurrent neural network (RNN) model, wherein training is carried out individually for each defect ID. On completion of training the model, weights can be assigned and saved in a hierarchical data format (HDF5), and the model configuration can be saved in a JavaScript object notation (JSON) format. While training the model, to determine the expected output, at least one embodiment of the invention includes multiplying the input with some value (the above-noted weights) which helps to maintain correlation strength between units.

At least one embodiment of the invention can also include generating predictions of future events decoding such predictions to obtain and/or derive corresponding event IDs. For example, one such embodiment can include predicting an event sequence for the next 30 minutes via use of model weights generated in an earlier phase (such as detailed above), wherein the output is in a vectorized form which can be decoded to obtain and/or derive the exact event IDs. In at least one embodiment of the invention, event IDs are encoded using sequence numbers (1, 2, 3, etc.) and maintained in a mapping file. In such an embodiment, the encoded event IDs can be decoded using the same mapping file.

Figure 4:
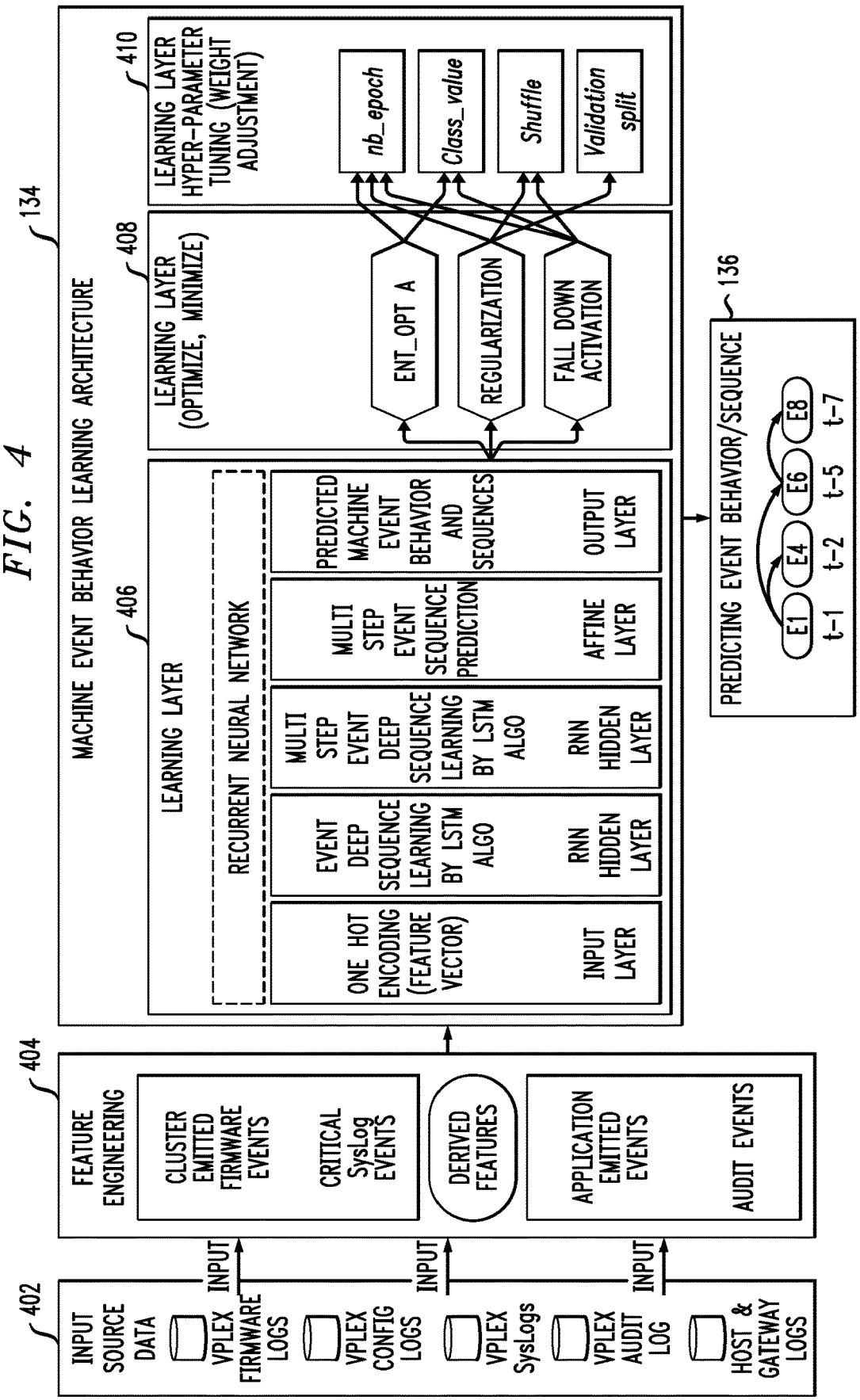
FIG. 4 shows system architecture of an illustrative embodiment of the invention.

FIG. 4 shows system architecture of an illustrative embodiment of the invention. By way of illustration, FIG. 4 depicts input source data 402, which provides input to a feature engineering component 404. The input source data 402 can include firmware logs, virtual computer data storage configuration logs, virtual computer data storage system logs (SysLogs), virtual computer data storage audit logs, host and gateway logs, I/O logs, object configuration logs, etc. Additionally, the feature engineering component 404 can include and/or generate, based on the inputs from input source data 402, cluster-emitted firmware events, critical SysLog events, one or more derived features, application-emitted events, and audit events. At least one embodiment of the invention includes generating a log file which contains all of the events listed in sequence, and the feature engineering component 404 generates data based on this log file (as depicted, for example in FIG. 10), wherein the generated data can be understood and/or processed by a neural network.

As also depicted in FIG. 4, the feature engineering component 404 outputs the noted event- and/or feature-related information to neural network model trainer 134, which includes machine event behavior learning architecture that includes learning layer 406, learning layer 408, and learning layer 410. Learning layer 406 can include a recurrent neural network, an input layer (which includes one hot encoding), a first RRN hidden layer (which includes event deep sequence learning via a long short-term memory (LS™) algorithm), a second RNN hidden layer (which includes multi-step event deep sequence learning via an LSTM algorithm), an affine layer (which includes multi-step event sequence predictions), and an output layer (which includes predicted machine event behavior and sequences). Additionally, learning layer 408 avoids over-fit of the model by applying regularization techniques, which consider required features by default. Also, learning layer 410 determines the number of times that the training input is used to update the weight(s) and to obtain an accurate output. One or more parameters used by learning layer 410 can be adjusted (for example, via a trial-and-error method).

Further, as additionally depicted in FIG. 4, the neural network model trainer 134 outputs information to DU/DL event prediction generator 136, which generates and outputs an event behavior and/or sequence prediction.

Figure 5:
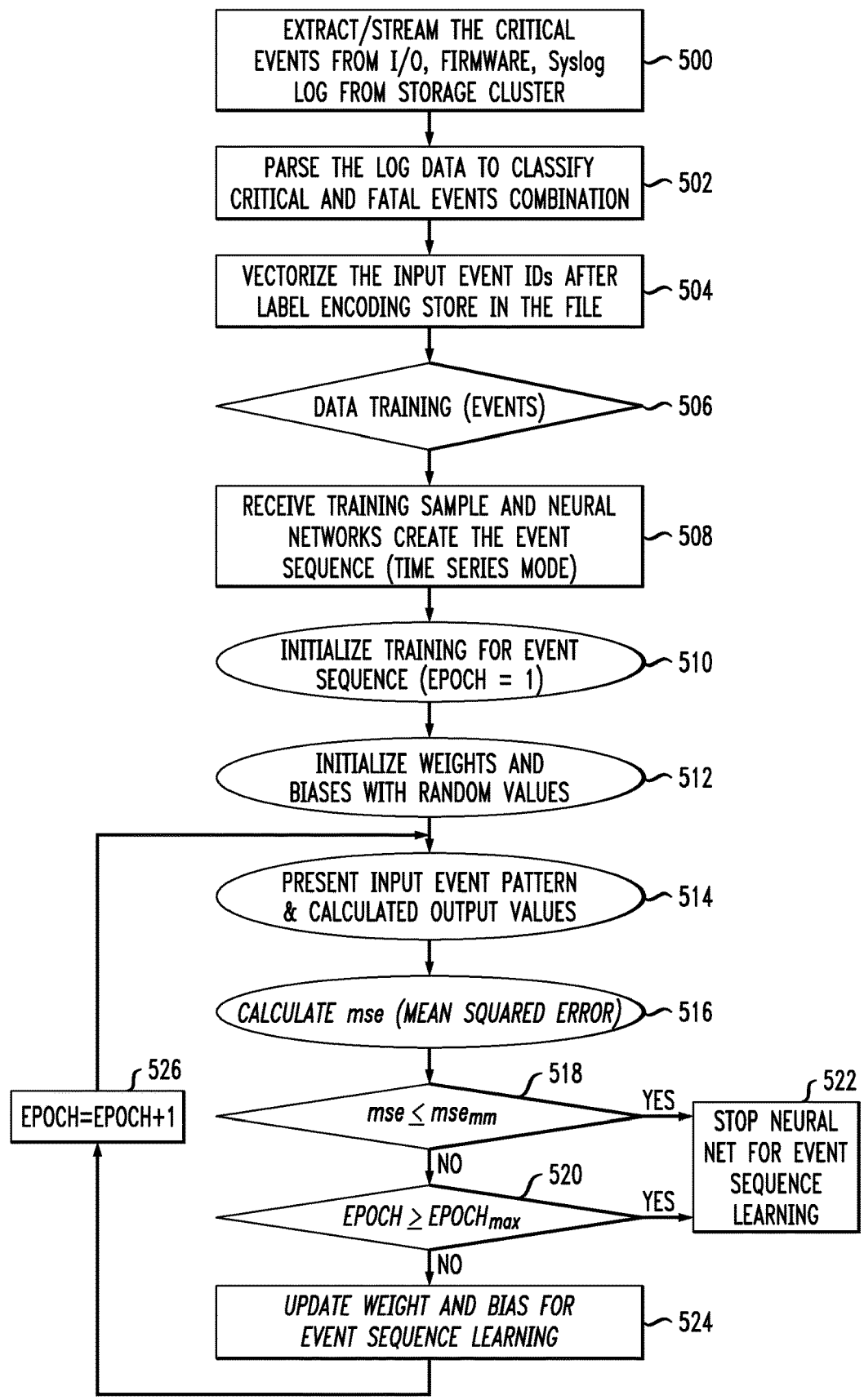
FIG. 5 shows a flow diagram of a model training process in an illustrative embodiment of the invention.

FIG. 5 shows a flow diagram of a model training process in an illustrative embodiment of the invention. Step 500 includes extracting and/or streaming critical events from data sources (such as I/O logs, firmware logs, SysLogs, etc.) from a storage cluster, and step 502 includes parsing the extracting log data to classify combinations of critical and/or fatal events. Step 504 includes vectorizing the input event IDs after label-encoding and storing in a file. Additionally, step 506 includes carrying out data training with respect to one or more events or event types. Step 508 includes receiving training samples and implementing one or more neural networks to create an event sequence (in a time series mode). Further step 510 includes initializing training for an event sequence (wherein the epoch=1). As used herein, an epoch refers to a measure of the number of times that the training data is to be used to update weights to obtain an optimal output. Step 512 includes initializing weights and biases using random values. As used herein, a bias can refer to a constant value which is to be added to the model to determine an output which is approximate to an actual output.

As also depicted in FIG. 5, step 514 includes presenting an input event pattern and calculated output values, and step 516 includes calculating the mean squared error (mse) of such output values. Step 518 includes determining whether mse≤$mse_{mm}$ (that is, the mean square error generated in the previous epoch run). If yes (that is, mse≤$mse_{mm}$), then step 522 includes stopping the neural network for event sequence learning. If no (that is, mse is not≤$mse_{mm}$), then step 520 includes determining whether the epoch≥$epoch_{max}$ (wherein $epoch_{max}$ is a constant value which is assumed based on trial-and-error (which can be changed)). If yes (that is, epoch≥$epoch_{max}$), then step 522 includes stopping the neural network for event sequence learning. If no (that is, epoch is not≥$epoch_{max}$), then step 524 includes updating the weight and bias values for event sequence learning, and step 526 includes updating the epoch to epoch+1, and returning to step 514.

Figure 6:
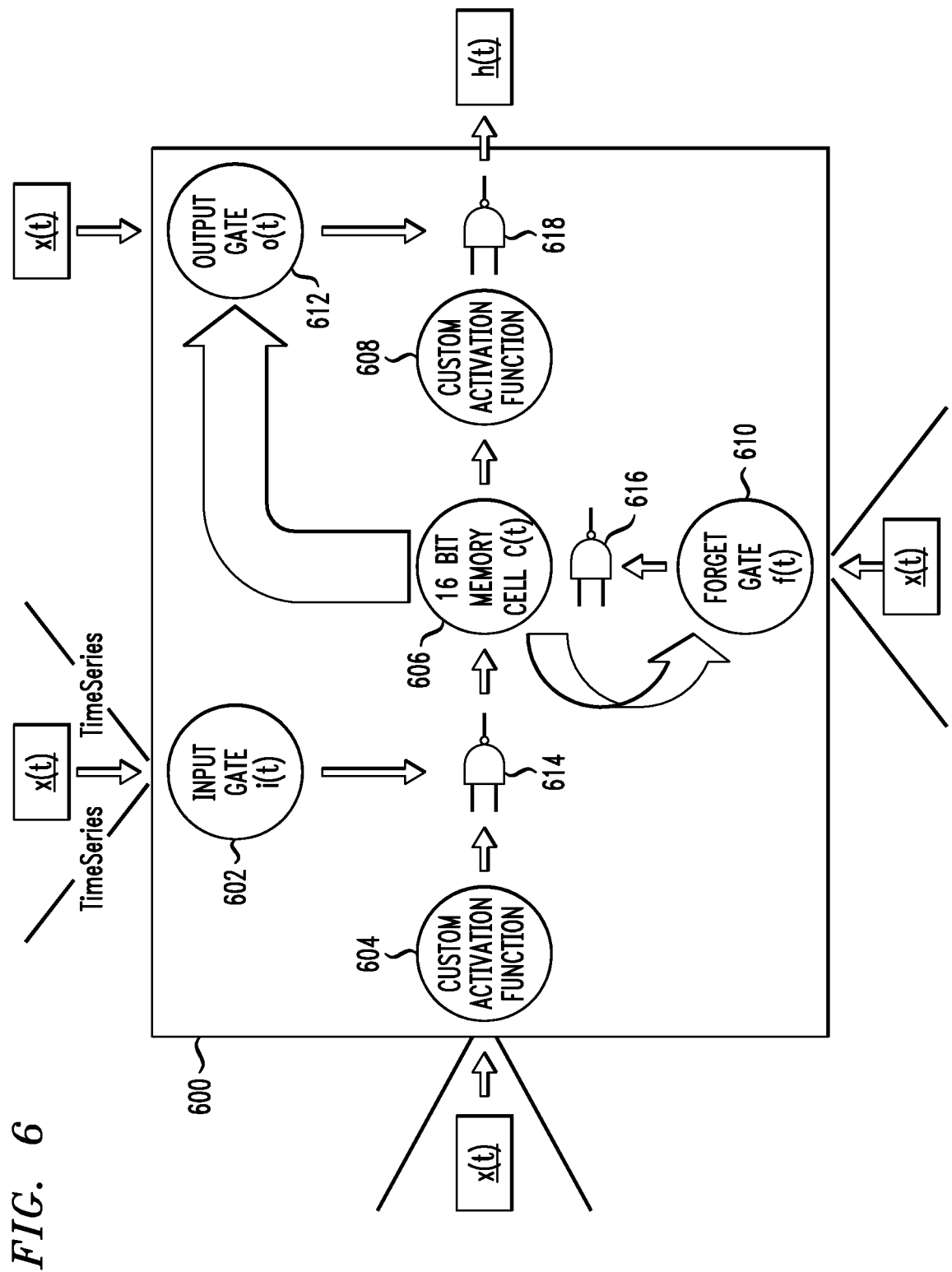
FIG. 6 shows an example model in an illustrative embodiment of the invention.

FIG. 6 shows an example model in an illustrative embodiment of the invention. As detailed herein, in one or more embodiments of the invention an RNN is implemented after pre-processing data for a neural network. A customized LSTM can also be used in the analytical model as an ensemble with an RNN, which can help preserve the error that can be back-propagated through time and layers. By maintaining a more constant error, recurrent networks are allowed to continue to learn over many time-steps (for example, over 1000 events), thereby opening a channel to link causes and effects remotely. FIG. 6, by way of illustration, depicts the structure of an example LSTM 600 with customized activation functions 604 and 608, which store information, as well as gates to protect and control (specifically, input gate 602, forget gate 610, and output gate 612). As also depicted in FIG. 6, element 606 represents a memory cell which stores the data in question. Also, element 614 generates input which is based on a customer function, element 616 interacts with the forget gate 610 to remember this input (or not remember the input), and element 618 transmits the input to the next hidden layer.

As described herein, a recurrent neural network contains feedback connections, so the activations (such as elements 604 and 608 in FIG. 6) can flow in a loop, enabling the network to carry out temporal processing and learn from sequences. By way of example, the decision of a recurrent network reached at time-step x(t−1) affects the decision that the recurrent network will reach one moment later at time-step x(t). Accordingly, recurrent networks (such as depicted in FIG. 6) can have two sources of input, a present source of input and a source of input from the recent past, both of which can be combined to determine a response to new data. Such time series information can be preserved in the recurrent network's hidden state, which can manage to span many time-steps as it cascades forward to affect the processing of each new time series. The process of carrying memory forward mathematically can be presented as follows:

$$h_t = \phi(Wx_t + Uh_{t-1}),$$

The hidden state at time-step t is $h_t$, which is a function of the input at the same time-step $x_t$, modified by a weight matrix W added to the hidden state of the previous time-step $h_{t-1}$, multiplied by its own hidden-state-to-hidden-state matrix U. The sum of the weight input and the hidden state can be compressed by the function φ, which represents a standard value for condensing very large or very small values into a logistic space, as well as making gradients workable for back-propagation. Because this feedback loop occurs at every time-step in the series, each hidden state contains traces not only of the previous hidden state, but also of all those that preceded $h_{t-1}$, for as long as the memory can persist.

Figure 7:
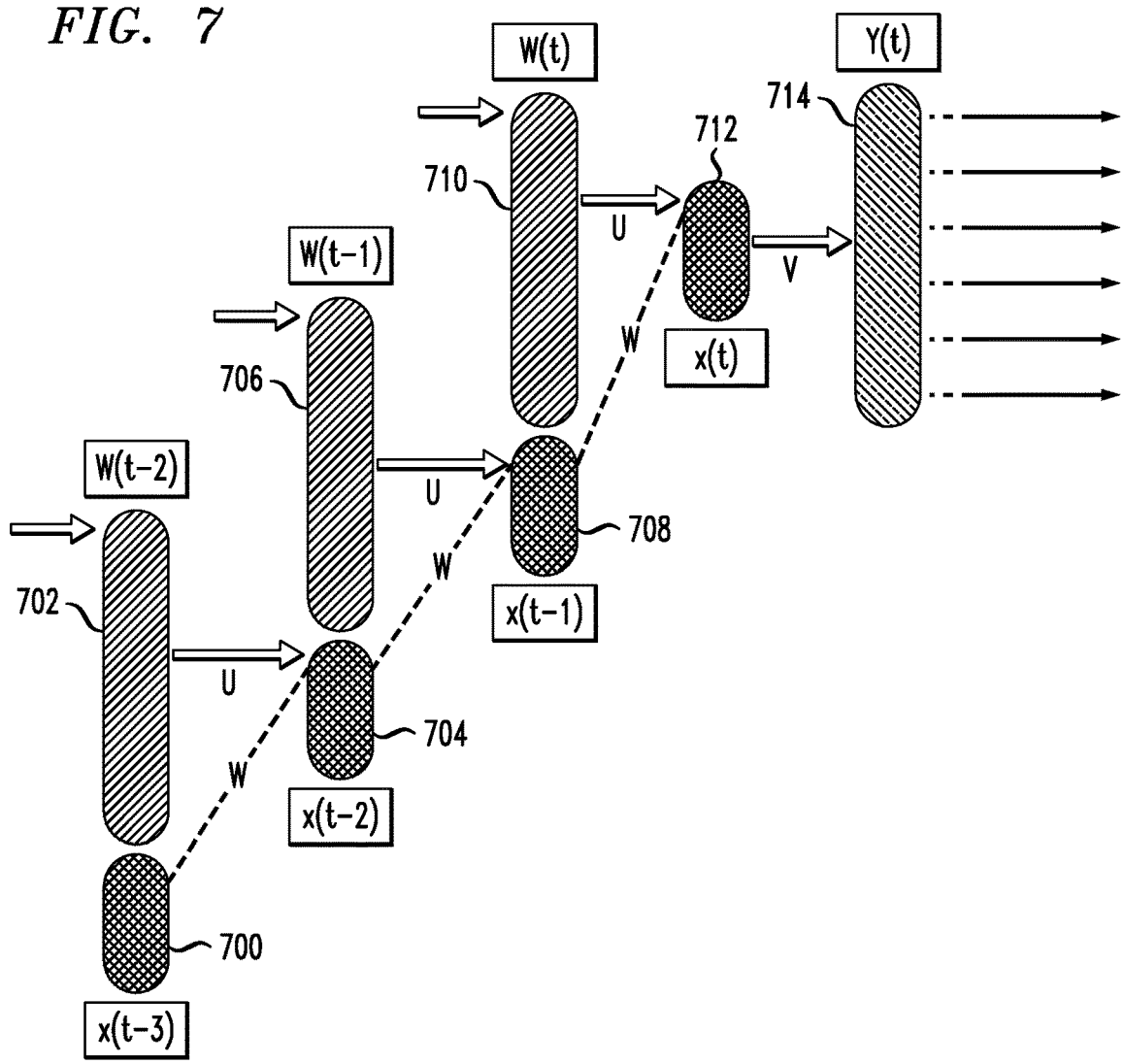
FIG. 7 shows event prediction within a temporal context in an illustrative embodiment of the invention.

FIG. 7 shows event prediction within a temporal context in an illustrative embodiment of the invention. By way of illustration, FIG. 7 depicts event 702 at time-step 700, event 706 at time-step 704, event 710 at time-step 708, as well as time-step 712 and (predicted) encoded event 714, which represents the output to the model based on previous events IDs. The example embodiment of the invention depicted in FIG. 7 includes maintaining information about events that occurred in the past, wherein the implemented function takes the past weights and events as input to predict the next event in the time series.

At least one embodiment of the invention can include utilizing and/or implemented a custom activation function in hidden layer, also referred to herein as a fall-down layer. A fall-down layer refers to a layer wherein the activation function is the maximum of the inputs, such as the following: max($w\_1^{TX}+b\_1$, $w\_2^{TX}+b\_2$), wherein b represents the bias to be added to the model input.

One or more embodiments of the invention can also include LSTM hyper-parameter tuning, which includes optimizing hyper-parameters for neural network for prediction. Such hyper-parameters can include, for example, an over-fitting parameter, a regularization parameter, one or more parameters pertaining to training over multiple epochs, a learning rate parameter, a momentum parameter, etc.

Figure 8:
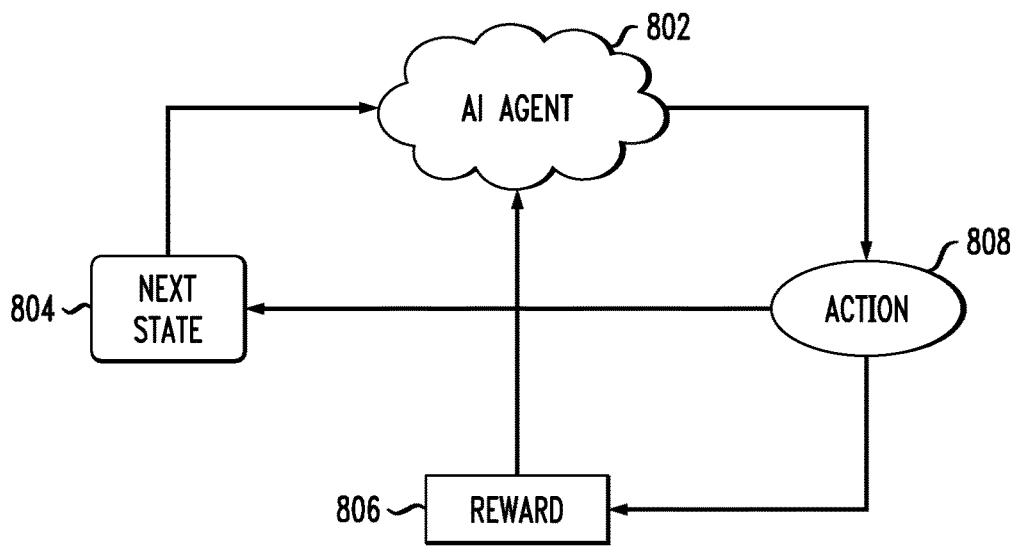
FIG. 8 shows implementation of a deep queue network in an illustrative embodiment of the invention.

FIG. 8 shows implementation of a deep queue network in an illustrative embodiment of the invention. To predict accurately even unknown events which may not have even occurred in the past, at least one embodiment of the invention includes training a model based on DQNs, which works based on self-learning by interacting with an environment as per below. As depicted in FIG. 8, an artificial intelligence (AI) agent 802 interacts with a given sequence of events generated by a storage array, and generates a reward 806 or a penalty associated with the observed sequence. A goal of the agent 802 includes selecting a sequence of events in a fashion which maximizes a cumulative future reward. Accordingly, in at least one embodiment of the invention, a deep recurrent network (Q) can be used to approximate the optimal action 808 value function, as follows:

$$Q^*(s, a) = \max_\pi \mathbb{E}[r_t + \gamma r_{t+1} + \gamma^2 r_{t+2} + \ldots | s_t = s, a_t = a, \pi]$$

This equation represents the maximum sum of rewards rt discounted by γ each time-step t. Additionally, in the equation, "a" represents an action, and "s" represents a state. After every action 808, the agent 802 receives feedback about the reward 806 and the next state 804 in a sequence. If the next event is predicted correctly, for example, then a reward of 1 is generated; otherwise, a reward of 0 is generated.

Using the techniques detailed herein in connection with one or more embodiments of the invention, virtual computer data storage product down-time can be significantly reduced or prevented by informing the support team about a failure in advance, whereby the team can take preemptive action and prevent the predicted failure or start working on a resolution before the instance fails.

FIG. 9 shows example log data 900 in an illustrative embodiment of the invention. As described above and herein, one or more embodiments of the invention include parsing virtual computer data storage product cluster logs, such as the example log data 900 depicted in FIG. 9.

FIG. 10 shows a table 1000 of parsed log data in an illustrative embodiment of the invention. By way of illustration, parsing of the FIG. 9 data 900 can result in the generation of required features (depicted in table 1000 in FIG. 10) for training, such features including, for example, time-stamp, IP address, event ID, event severity, and sequence number. Such data can additionally be boosted by removing noise as well as condensing repeated similar events.

Figures 11, 12:
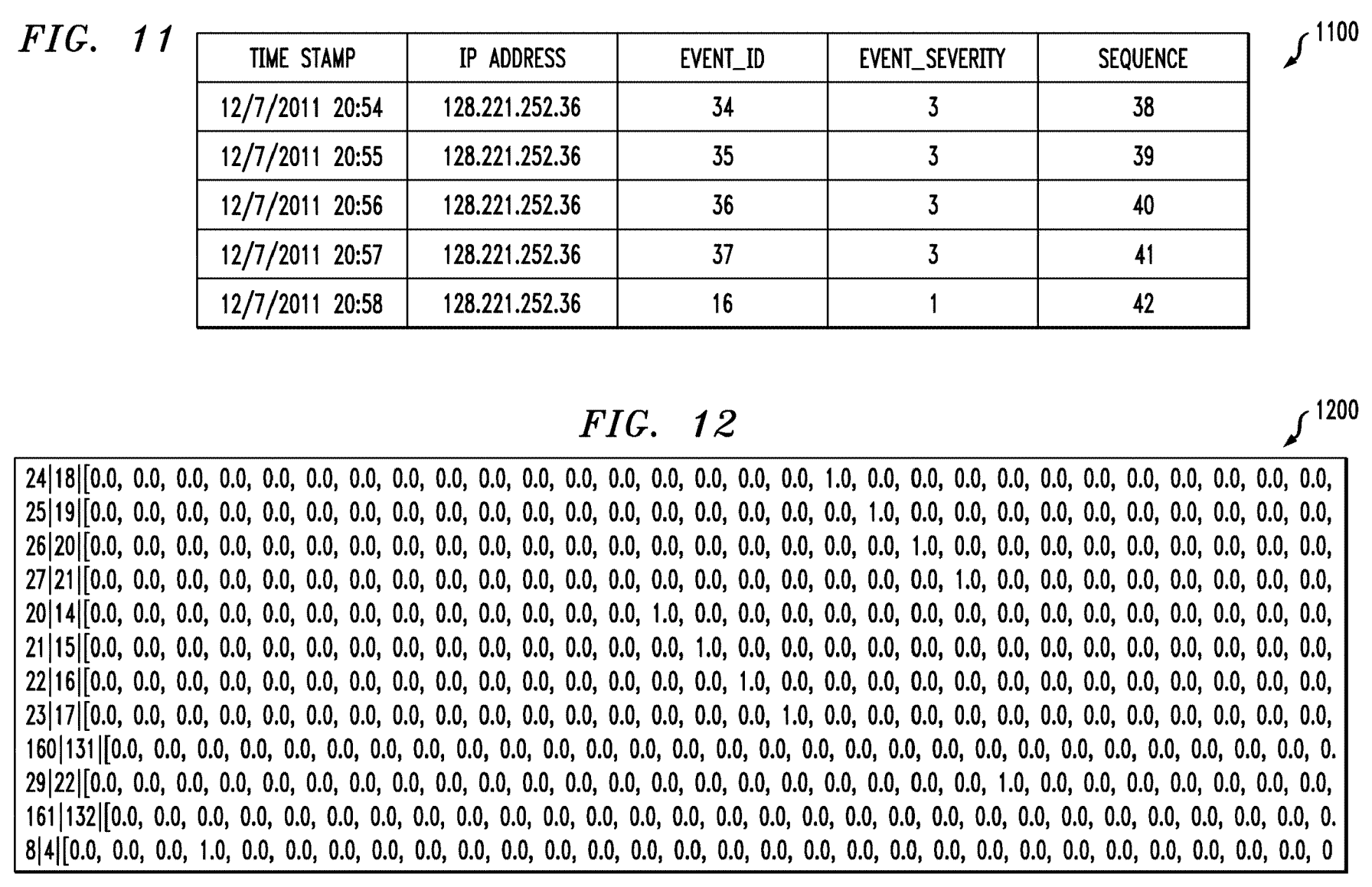

FIG. 11 shows a table 1100 of encoded event IDs in an illustrative embodiment of the invention. As also detailed herein, at least one embodiment of the invention includes pre-processing log data into a format that is compatible with a neural network. By way of example, such an embodiment can include applying a one hot encoding algorithm to encode event IDs with numerical values, such as depicted in table 1100 in FIG. 11.

FIG. 12 shows an example map file 1200 in an illustrative embodiment of the invention. In accordance with one or more embodiments of the invention, data, such as illustrated in table 1100 of FIG. 11, can be vectorized and stored in a map file 1200, which can include a format such as event ID|Label|Vector.

Figure 13:
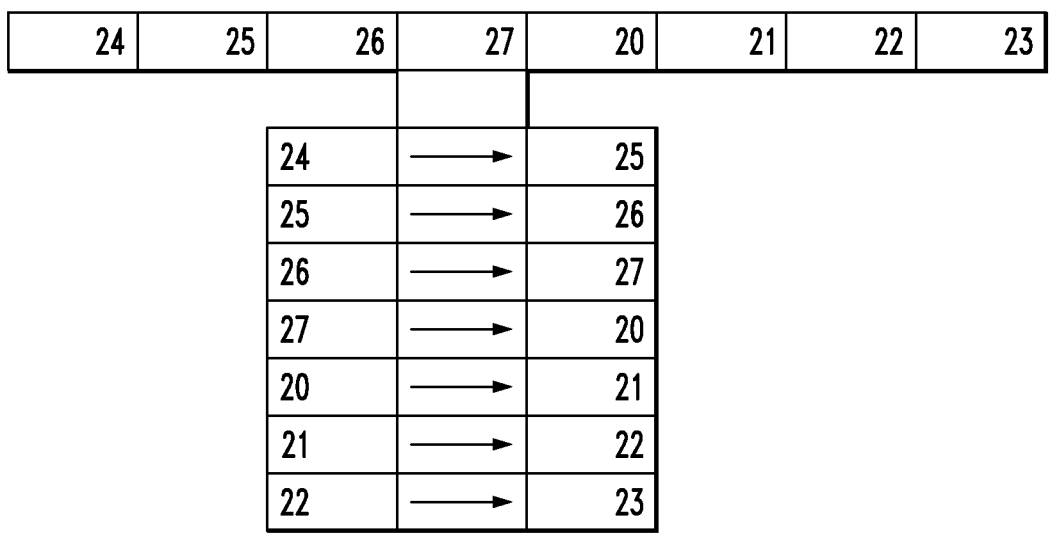
FIG. 13 shows sequencing of encoded event IDs in an illustrative embodiment of the invention.

FIG. 13 shows sequencing of encoded event IDs 1300 in an illustrative embodiment of the invention. By way of example, the map file 1200 of FIG. 12 can be used to encode all of the event IDs in a source file (such as depicted in FIG. 13), which can then be stored in a memory. The input sequence and/or patterns of event IDs can be retained and provided to a neural network model as input in the same sequence/pattern.

As also detailed herein, at least one embodiment of the invention includes model configuration and training. An RNN model can be used to train time series data and learn from the series of sequences. As described herein, such an embodiment can include taking one or more hyper-parameters, along with additional data, as input before training the model. The values of such parameters can be optimized by running an algorithm on the dataset with a different set of the values. At the end of configuration, the loaded data can be passed to a multi-layer recurrent neural network model, and training can be carried out individually for each defect. On completion of the training, model weights and configuration details can be saved, for example, in an XML file. By way of illustration, FIG. 14 shows an example XML file 1400 containing model weights and configuration details in an illustrative embodiment of the invention.

Referring again to log data collection, one or more embodiments of the invention can include reading log data generated in connection with a virtual computer data storage server in real-time, periodically checking for newly-added log availability and passing such log data to a parsing mechanism to collect one or more features. Such an embodiment can additionally include converting the data collected in the specified interval into a resilient distributed dataset (RDD), wherein the RDD is then parsed and pre-processed. Preprocessing can include removing noisy data from the training data set and vectorizing categorical data. The data can additionally be segregated by defect ID and sorted by time to create time series data to provide to a neural network for training. By way of illustration, FIG. 15 shows example time series data 1500 in an illustrative embodiment of the invention.

Figures 16, 17:
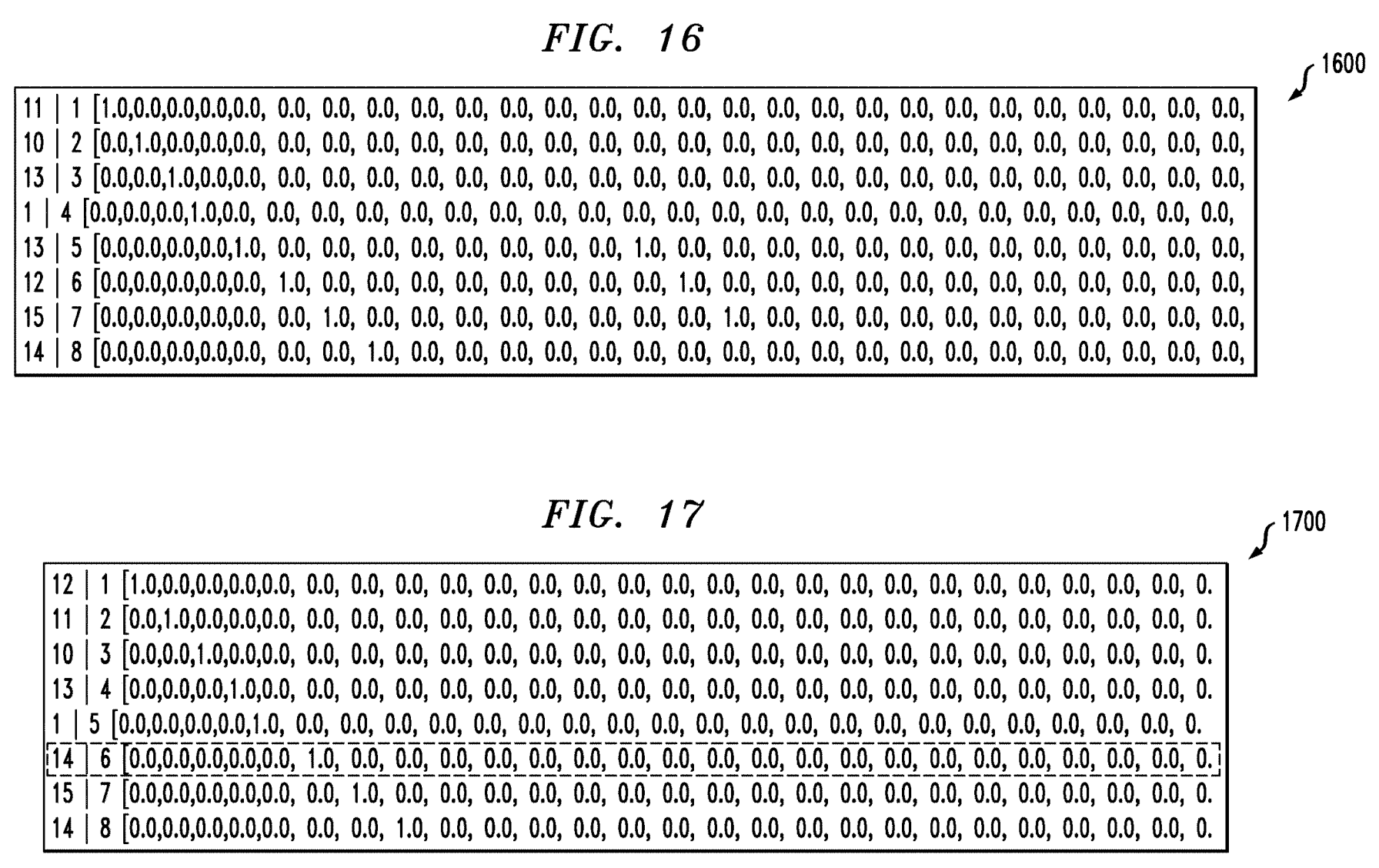

Additionally, as noted herein, one or more embodiments of the invention include generating future event predictions. FIG. 16 shows example vector data 1600 in an illustrative embodiment of the invention, and FIG. 17 shows event prediction vector data 1700 in an illustrative embodiment of the invention. Vectored input, such as depicted via data 1600 in FIG. 16, can be provided to the trained model for a given defect ID, wherein the model can be imported from an external file stored after the training process (such as detailed above). A prediction function can then accept the input vector(s) and generate one or more predicted events in vector format, such as depicted via vector data 1700 in FIG. 17, which can then be stored in a file.

Further, as also detailed herein, at least one embodiment of the invention includes event decoding and predicted events storage. In such an embodiment, the predicted events are in a vectorized format (as illustrated in FIG. 17) that can be decoded into event IDs for presentation to the user. Event decoding can be carried out, for example, with the help of a map file generated during the encoding process, wherein the map file can include categorical data, label data, and the vector of that label data. After the decoding process, a predicted event ID can be stored in a database along with a predicted time corresponding thereto. Additionally, predicted events can be stored per defect ID so that, for example, with a corresponding IP address, the predicted event can be mapped to a respective virtual computer data storage product cluster. By way of illustration, FIG. 18 shows a table 1800 of predicted event IDs in an illustrative embodiment of the invention.

FIG. 19 is a flow diagram of a process for learning machine behavior related to install base information and determining event sequences based thereon, in an illustrative embodiment. It is to be understood that this particular process is only an example, and additional or alternative processes can be carried out in other embodiments.

In this embodiment, the process includes steps 1900 through 1908. These steps are assumed to be performed by the processor 120 utilizing its modules 130, 132, 134 and 136.

Step 1900 includes parsing a set of data storage information based at least in part on multiple parameters related to install base information, wherein the multiple parameters comprise at least one temporal parameter and one or more event-related parameters. The set of data storage information can include a set of virtual data storage logs, as well as firmware information, message logging information, input and output logs, and/or product configuration logs. Additionally, the at least one temporal parameter can include, for example, a time-stamp, and the one or more event-related parameters can include internet protocol address, event identifier, event severity, and/or sequence number.

Step 1902 includes formatting the parsed set of data storage information into a parsed set of sequential data storage information compatible with at least one neural network model. Formatting the parsed set of data storage information can include fetching all event identifiers from the parsed set of data storage information, assigning an integer label to each of the fetched event identifiers, and vectorizing the assigned integer labels. Also, the parsed set of sequential data storage information compatible with the at least one neural network model can include at least one map file comprising information pertaining to mapping of event identifiers to integer labels to vectorized integer labels.

At least one embodiment of the invention can additionally include encoding all event identifiers from the parsed set of sequential data storage information using the map file, and storing the encoded event identifiers in the memory. Such an embodiment, as further detailed herein, can also include predicting a future instance of a vectorized integer label corresponding to at least one of a data unavailability event and a data loss event, deriving one of the encoded event identifiers from the memory based at least in part on the predicted future instance of the vectorized integer label, and decoding the derived encoded event identifier.

Step 1904 includes training the at least one neural network model using the parsed set of sequential data storage information and one or more additional training parameters, wherein training comprises learning one or more patterns in the parsed set of sequential data storage information and a connection between the one or more patterns and at least one of a data unavailability event and a data loss event. The at least one neural network model can include at least one recurrent neural network model and/or a neural network model trained via one or more deep queue networks, wherein the one or more deep queue networks implement an artificial intelligence agent to interact with a given sequence of events and generate at least one of a reward and a penalty based at least in part on the interaction with the given sequence of events. Additionally, the one or more additional training parameters can include number of hidden layers, learning rate, number of epochs, number of cycles, and/or neural network momentum.

Step 1906 includes predicting, by applying the at least one trained neural network model to the parsed set of sequential data storage information, at least one of a future data unavailability event and a future data loss event. Step 1908 includes outputting an alert based at least in part on the predicting of at least one of a future data unavailability event and a future data loss event.

The techniques depicted in FIG. 19 can also include applying a machine learning algorithm to the parsed set of data storage information to suppress multiple iterations of a repetitive event identifier into a single event identifier.

Accordingly, the particular processing operations and other network functionality described in conjunction with the flow diagram of FIG. 19 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional DU/DL avoidance approaches. For example, some embodiments are configured to provide patterning and predictions of critical events categorized by machine segment. These and other embodiments can effectively facilitate improvements of machine segments and improvements of the quality of virtual computer data storage product install base signatures.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 20 and 21. Although described in the context of system 100, these platforms may also be used to implement at least portions of other information processing systems in other embodiments.

Figure 20:
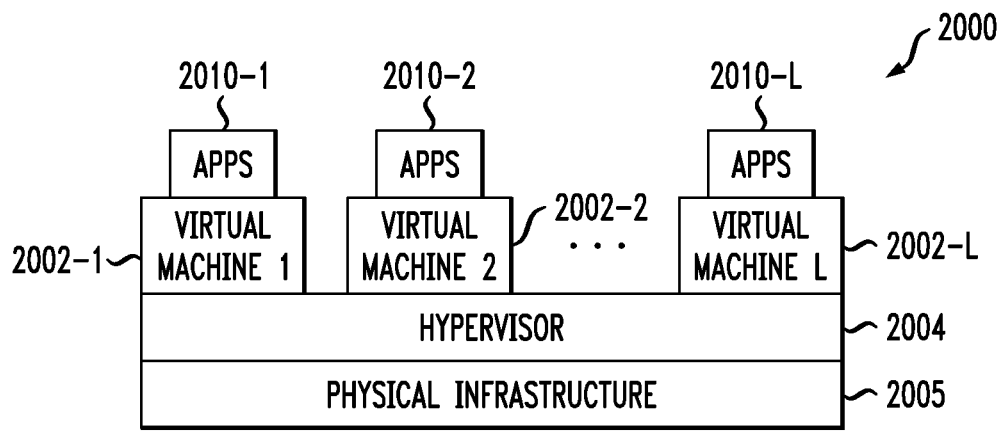
FIGS. 20 and 21 show examples of processing platforms that may be utilized to implement at least a portion of an information processing system in illustrative embodiments.
Figure 21:
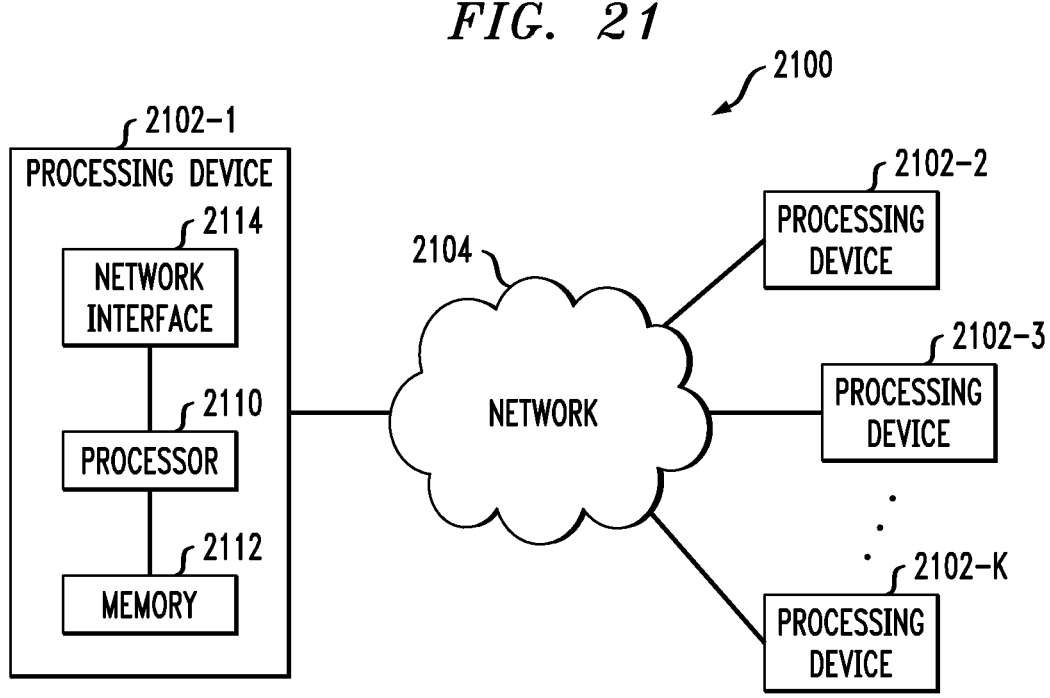

FIG. 20 shows an example processing platform comprising cloud infrastructure 2000. The cloud infrastructure 2000 comprises a combination of physical and virtual processing resources that may be utilized to implement at least a portion of the information processing system 100. The cloud infrastructure 2000 comprises VMs 2002-1, 2002-2, . . . 2002-L implemented using a hypervisor 2004. The hypervisor 2004 runs on physical infrastructure 2005. The cloud infrastructure 2000 further comprises sets of applications 2010-1, 2010-2, . . . 2010-L running on respective ones of the virtual machines 2002-1, 2002-2, . . . 2002-L under the control of the hypervisor 2004.

Although only a single hypervisor 2004 is shown in the embodiment of FIG. 20, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 2004 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2000 shown in FIG. 20 may represent at least a portion of one processing platform. Another example of such a processing platform is processing platform 2100 shown in FIG. 21.

The processing platform 2100 in this embodiment comprises a portion of system 100 and includes a plurality of processing devices, denoted 2102-1, 2102-2, 2102-3, . . . 2102-K, which communicate with one another over a network 2104.

The network 2104 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 2102-1 in the processing platform 2100 comprises a processor 2110 coupled to a memory 2112.

The processor 2110 may comprise a microprocessor, a microcontroller, an application-specific integrated circuit (ASIC), a field-programmable gate array (FPGA) or other type of processing circuitry, as well as portions or combinations of such circuitry elements.

The memory 2112 may comprise random access memory (RAM), read-only memory (ROM) or other types of memory, in any combination. The memory 2112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2102-1 is network interface circuitry 2114, which is used to interface the processing device with the network 2104 and other system components, and may comprise conventional transceivers.

The other processing devices 2102 of the processing platform 2100 are assumed to be configured in a manner similar to that shown for processing device 2102-1 in the figure.

Again, the particular processing platform 2100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to learn machine behavior related to install base information and determine event sequences based thereon. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising steps of: parsing a set of data storage information based at least in part on multiple parameters related to install base information, wherein the multiple parameters comprise at least one temporal parameter and one or more event-related parameters; formatting the parsed set of data storage information into a parsed set of sequential data storage information compatible with at least one neural network model, wherein formatting the parsed set of data storage information comprises obtaining one or more event identifiers from the parsed set of data storage information, assigning at least one label to each of the one or more obtained event identifiers, and generating a vector representation of at least a portion of the one or more assigned labels corresponding to the event identifiers from the formatted parsed set of data storage information; training the at least one neural network model using the parsed set of sequential data storage information and one or more additional training parameters, wherein training comprises learning one or more patterns in the parsed set of sequential data storage information and a connection between the one or more patterns and at least one of a data unavailability event and a data loss event; predicting, by applying the at least one trained neural network model to the parsed set of sequential data storage information, at least one of a future data unavailability event and a future data loss event; and outputting an alert based at least in part on the predicting of at least one of a future data unavailability event and a future data loss event; wherein the method is performed by at least one processing device comprising a processor coupled to a memory.

2. The computer-implemented method of claim 1, further comprising:
applying a machine learning algorithm to the parsed set of data storage information to suppress multiple iterations of a repetitive event identifier into a single event identifier.

3. The computer-implemented method of claim 1, wherein the set of data storage information comprises a set of virtual data storage logs.

4. The computer-implemented method of claim 1, wherein the set of data storage information comprises at least one of firmware information, message logging information, input and output logs, and product configuration logs.

5. The computer-implemented method of claim 1, wherein the at least one temporal parameter comprises a time-stamp.

6. The computer-implemented method of claim 1, wherein the one or more event-related parameters comprises at least one of internet protocol address, event identifier, event severity, and sequence number.

7. The computer-implemented method of claim 1, wherein assigning at least one label to each of the one or more obtained event identifiers comprises
assigning at least one integer label to each of the one or more obtained event identifiers.

8. The computer-implemented method of claim 1, wherein the parsed set of sequential data storage information compatible with the at least one neural network model comprises at least one map file comprising information pertaining to mapping of at least one of the one or more event identifiers to the vector representation of at least a portion of the assigned labels.

9. The computer-implemented method of claim 8, further comprising:
encoding at least one of the one or more event identifiers from the parsed set of sequential data storage information using the at least one map file; and
storing the at least one encoded event identifier in the memory.

10. The computer-implemented method of claim 9, wherein predicting comprises predicting a future instance of the vector representation of at least a portion of the one or more assigned labels corresponding to at least one of a data unavailability event and a data loss event.

11. The computer-implemented method of claim 10, further comprising:
deriving one of the at least one encoded event identifier from the memory based at least in part on the predicted future instance of the vector representation of at least a portion of the one or more assigned labels; and
decoding the derived encoded event identifier.

12. The computer-implemented method of claim 1, wherein the at least one neural network model comprises at least one recurrent neural network model.

13. The computer-implemented method of claim 1, wherein the at least one neural network model comprises a neural network model trained via one or more deep queue networks, and wherein the one or more deep queue networks implement an artificial intelligence agent to interact with a given sequence of events and generate at least one of a reward and a penalty based at least in part on the interaction with the given sequence of events.

14. The computer-implemented method of claim 1, wherein the one or more additional training parameters comprise at least one of number of hidden layers, learning rate, number of epochs, number of cycles, and neural network momentum.

15. A non-transitory processor-readable storage medium having stored therein program code of one or more software programs, wherein the program code when executed by at least one processing device causes said at least one processing device: to parse a set of data storage information based at least in part on multiple parameters related to install base information, wherein the multiple parameters comprise at least one temporal parameter and one or more event-related parameters; to format the parsed set of data storage information into a parsed set of sequential data storage information compatible with at least one neural network model, wherein formatting the parsed set of data storage information comprises obtaining one or more event identifiers from the parsed set of data storage information, assigning at least one label to each of the one or more obtained event identifiers, and generating a vector representation of at least a portion of the one or more assigned labels corresponding to the event identifiers from the formatted parsed set of data storage information; to train the at least one neural network model using the parsed set of sequential data storage information and one or more additional training parameters, wherein training comprises learning one or more patterns in the parsed set of sequential data storage information and a connection between the one or more patterns and at least one of a data unavailability event and a data loss event; to predict, by applying the at least one trained neural network model to the parsed set of sequential data storage information, at least one of a future data unavailability event and a future data loss event; and to output an alert based at least in part on the predicting of at least one of a future data unavailability event and a future data loss event.

16. The non-transitory processor-readable storage medium of claim 15, wherein the program code when executed by at least one processing device further causes said at least one processing device:
to apply a machine learning algorithm to the parsed set of data storage information to suppress multiple iterations of a repetitive event identifier into a single event identifier.

17. The non-transitory processor-readable storage medium of claim 15, wherein assigning at least one label to each of the one or more obtained event identifiers comprises
assigning at least one integer label to each of the one or more obtained event identifiers.

18. An apparatus comprising: at least one processing device comprising a processor coupled to a memory; said at least one processing device being configured: to parse a set of data storage information based at least in part on multiple parameters related to install base information, wherein the multiple parameters comprise at least one temporal parameter and one or more event-related parameters; to format the parsed set of data storage information into a parsed set of sequential data storage information compatible with at least one neural network model, wherein formatting the parsed set of data storage information comprises obtaining one or more event identifiers from the parsed set of data storage information, assigning at least one label to each of the one or more obtained event identifiers, and generating a vector representation of at least a portion of the one or more assigned labels corresponding to the event identifiers from the formatted parsed set of data storage information; to train the at least one neural network model using the parsed set of sequential data storage information and one or more additional training parameters, wherein training comprises learning one or more patterns in the parsed set of sequential data storage information and a connection between the one or more patterns and at least one of a data unavailability event and a data loss event; to predict, by applying the at least one trained neural network model to the parsed set of sequential data storage information, at least one of a future data unavailability event and a future data loss event; and to output an alert based at least in part on the predicting of at least one of a future data unavailability event and a future data loss event.

19. The apparatus of claim 18, wherein said at least one processing device being further configured:
to apply a machine learning algorithm to the parsed set of data storage information to suppress multiple iterations of a repetitive event identifier into a single event identifier.

20. The apparatus of claim 18, wherein assigning at least one label to each of the one or more obtained event identifiers comprises
assigning at least one integer label to each of the one or more obtained event identifiers.

* * * * *